US012427638B2

(12) United States Patent
Bloom-Edmonds et al.

(10) Patent No.: US 12,427,638 B2
(45) Date of Patent: Sep. 30, 2025

(54) PERCUSSION TOOL

(71) Applicant: MILWAUKEE ELECTRIC TOOL CORPORATION, Brookfield, WI (US)

(72) Inventors: John Bloom-Edmonds, Menomonee Falls, WI (US); Kyle Krause, Milwaukee, WI (US); Jeffery D. Spraggon, Pewaukee, WI (US); Andrew D. Van Hoorn, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/539,983

(22) Filed: Dec. 14, 2023

(65) Prior Publication Data

US 2024/0198505 A1 Jun. 20, 2024

Related U.S. Application Data

(60) Provisional application No. 63/476,197, filed on Dec. 20, 2022.

(51) Int. Cl.
*B25D 11/04* (2006.01)
*B25D 11/12* (2006.01)

(52) U.S. Cl.
CPC ............ *B25D 11/04* (2013.01); *B25D 11/125* (2013.01); *B25D 2250/035* (2013.01); *B25D 2250/365* (2013.01); *B25D 2250/375* (2013.01)

(58) Field of Classification Search
CPC B25D 11/04; B25D 11/125; B25D 2250/035; B25D 2250/365; B25D 2250/375
USPC ........................................................ 173/204
See application file for complete search history.

(56) References Cited

U.S. PATENT DOCUMENTS

| | | | | |
|---|---|---|---|---|
| 5,775,440 A | | 7/1998 | Shinma | |
| 5,873,418 A | | 2/1999 | Arakawa et al. | |
| 5,975,217 A | * | 11/1999 | Frenzel | B25D 11/125 173/109 |
| 5,992,541 A | | 11/1999 | Frenzel et al. | |

(Continued)

FOREIGN PATENT DOCUMENTS

| | | |
|---|---|---|
| CN | 102161190 A | 8/2011 |
| CN | 113561342 A | 10/2021 |

(Continued)

*Primary Examiner* — Michelle Lopez
(74) *Attorney, Agent, or Firm* — Quarles & Brady LLP

(57) ABSTRACT

A percussion tool including a parking assembly movable relative to a spindle. The parking assembly includes a seat coupled to the spindle, a first shuttle portion movable relative to an outer surface of the spindle, a biasing member positioned between the seat and the first shuttle portion, a second shuttle portion movable relative to the outer surface of the spindle, a bushing positioned within the spindle and configured to receive a portion of an anvil, and a fastener that couples the second shuttle portion to the bushing. The first shuttle portion and the second shuttle portion are movable together between a working position, in which a plurality of radial air vents in the spindle is closed, and an idle position, in which the plurality of radial air vents is open. The biasing member is configured to bias the first shuttle portion and the second shuttle portion into the idle position.

21 Claims, 11 Drawing Sheets

(56) References Cited

U.S. PATENT DOCUMENTS

| | | | | |
|---|---|---|---|---|
| 6,116,352 | A | 9/2000 | Frauhammer et al. | |
| 6,431,290 | B1 | 8/2002 | Muhr et al. | |
| 6,644,418 | B2 | 11/2003 | Haga | |
| 7,040,413 | B2 * | 5/2006 | Mueller | B25D 11/005 173/13 |
| 7,306,048 | B2 | 12/2007 | Yamazaki | |
| 7,325,624 | B2 | 2/2008 | Yamazaki | |
| 2013/0192861 | A1 * | 8/2013 | Braun | B25D 11/005 173/162.2 |
| 2015/0158166 | A1 * | 6/2015 | Schlesak | B25D 11/005 173/112 |

FOREIGN PATENT DOCUMENTS

| | | | |
|---|---|---|---|
| DE | 3932134 | A1 | 4/1991 |
| DE | 102019208953 | A2 | 12/2020 |
| EP | 2239100 | A2 | 10/2010 |
| EP | 2564985 | A1 | 3/2013 |
| EP | 2674257 | A1 | 12/2013 |
| WO | 2020056654 | A1 | 3/2020 |

* cited by examiner

PERCUSSION TOOL

CROSS-REFERENCE TO RELATED APPLICATIONS

This application claims priority to U.S. Provisional Patent Application No. 63/476,197, filed on Dec. 20, 2022, the entire contents of which is incorporated herein by reference.

FIELD OF THE INVENTION

The present invention relates to power tools, and more particularly to percussion tools for imparting axial impacts upon a tool bit.

BACKGROUND OF THE INVENTION

Percussion tools, such as breakers or demolition hammers, are power tools that impart axial impacts to an attached chisel to demolish a work surface. Percussion tools may be powered by an AC or DC power source.

SUMMARY OF THE INVENTION

In some aspects, the techniques described herein relate to a percussion tool adapted to impart axial impacts to a tool bit, the percussion tool including: a housing; a motor supported by the housing; a spindle supported by the housing and including a plurality of radial air vents; a reciprocation mechanism operable to create a variable pressure air spring within the spindle; a striker received within the spindle for reciprocation in response to a pressure of the variable pressure air spring; an anvil received within the spindle and configured to be impacted by the striker, the anvil configured to transmit axial impacts from the striker to the tool bit; a chuck for securing the tool bit to the spindle; and a parking assembly movable relative to the spindle to selectively open and close the plurality of radial air vents, the parking assembly including a seat coupled to the spindle, a first shuttle portion movable relative to an outer surface of the spindle, a biasing member positioned between the seat and the first shuttle portion, a second shuttle portion movable relative to the outer surface of the spindle, a bushing positioned within the spindle and configured to receive a portion of the anvil, and a fastener that couples the second shuttle portion to the bushing, wherein the first shuttle portion and the second shuttle portion are movable together between a working position, in which the plurality of radial air vents is closed, and an idle position, in which the plurality of radial air vents is open, and wherein the biasing member is configured to bias the first shuttle portion and the second shuttle portion into the idle position.

In some aspects, the techniques described herein relate to a percussion tool, wherein the first shuttle portion is formed from a first material, and wherein the second shuttle portion, the bushing, and the fastener are formed from a second material.

In some aspects, the techniques described herein relate to a percussion tool, wherein the first material is metal and the second material is plastic.

In some aspects, the techniques described herein relate to a percussion tool, wherein the seat includes a wall extending therefrom, the circumferential wall spaced apart from an outer surface of the spindle and surrounding the plurality of radial air vents.

In some aspects, the techniques described herein relate to a percussion tool, wherein the first shuttle portion includes an inner surface and an annular recess in the inner surface, and wherein an elastomeric ring is positioned within the annular recess, the elastomeric ring configured to cover the plurality of radial air vents in the working position.

In some aspects, the techniques described herein relate to a percussion tool, wherein the parking assembly further includes an elastomeric ring positioned between the first shuttle portion and the second shuttle portion.

In some aspects, the techniques described herein relate to a percussion tool, wherein the elastomeric ring contacts the first shuttle portion and the second shuttle portion.

In some aspects, the techniques described herein relate to a percussion tool, wherein the first shuttle portion includes a flange and a circumferential wall extending axially from the flange, wherein the second shuttle portion includes a flange extending therefrom, and wherein the elastomeric ring is positioned between the outer surface of the spindle and the circumferential wall of the first shuttle portion, and also between the flange of the first shuttle portion and the flange of the second shuttle portion.

In some aspects, the techniques described herein relate to a percussion tool, wherein the flange of the second shuttle portion is a first flange positioned at or adjacent a first end thereof, wherein the second shuttle portion further includes a second flange positioned at or adjacent a second end thereof, a third flange positioned between the first end and the second end, a first plurality of radial apertures positioned between the first flange and the third flange, and a second plurality of radial apertures positioned between the third flange and the second flange, wherein each of the first plurality of radial apertures and the second plurality of radial apertures are configured overlie one of a plurality of elongated air vents in the spindle, and wherein the fastener extends through one of the second plurality of radial apertures and one of the plurality of elongated air vents into an aperture of the bushing.

In some aspects, the techniques described herein relate to a percussion tool, wherein the elastomeric ring is a first elastomeric ring, and wherein the parking assembly further includes a second elastomeric ring positioned between the third flange and the second flange, and wherein the second elastomeric ring surrounds the second plurality of radial apertures and the fastener.

In some aspects, the techniques described herein relate to a percussion tool, wherein the first shuttle portion includes an inner surface and an annular recess in the inner surface, and wherein a third elastomeric ring is positioned within the annular recess, the third elastomeric ring configured to cover the plurality of radial air vents in the working position.

In some aspects, the techniques described herein relate to a percussion tool adapted to impart axial impacts to a tool bit, the percussion tool including: a housing; a motor supported by the housing; a spindle supported by the housing and including a plurality of radial air vents; a reciprocation mechanism operable to create a variable pressure air spring within the spindle; a striker received within the spindle for reciprocation in response to a pressure of the variable pressure air spring; an anvil received within the spindle and configured to be impacted by the striker, the anvil configured to transmit axial impacts from the striker to the tool bit; a chuck for securing the tool bit to the spindle; and a parking assembly movable relative to the spindle to selectively open and close the plurality of radial air vents, the parking assembly including a seat coupled to the spindle, a first shuttle portion movable relative to an outer surface of the spindle, a biasing member positioned between the seat and the first shuttle portion, a second shuttle portion movable relative to the outer surface of the spindle, an elastomeric ring positioned between and contacting the first shuttle portion and the second shuttle portion, and a fastener that couples the second shuttle portion to the anvil, wherein the first shuttle portion, the elastomeric ring, and the second shuttle portion are movable together between a working position, in which the plurality of radial air vents is closed, and an idle position, in which the plurality of radial air vents is open, and wherein the biasing member is configured to bias the first shuttle portion and the second shuttle portion into the idle position.

In some aspects, the techniques described herein relate to a percussion tool, wherein the elastomeric ring is a first elastomeric ring, wherein the first shuttle portion includes an inner surface and an annular recess in the inner surface, and wherein a second elastomeric ring is positioned within the annular recess, the second elastomeric ring configured to cover the plurality of radial air vents in the working position.

In some aspects, the techniques described herein relate to a percussion tool, further including a bushing positioned within the spindle and configured to receive a portion of the anvil, and wherein the fastener couples the second shuttle portion to the bushing.

In some aspects, the techniques described herein relate to a percussion tool, wherein the second shuttle portion includes a first plurality of radial apertures positioned adjacent a first end thereof and a second plurality of radial apertures adjacent a second end thereof, wherein each of the first plurality of radial apertures and the second plurality of radial apertures are configured to overlie one of a plurality of elongated air vents in the spindle, and wherein the fastener extends through one of the second plurality of radial apertures and one of the plurality of elongated air vents into an aperture of the bushing.

In some aspects, the techniques described herein relate to a percussion tool, wherein the parking assembly further includes a third elastomeric ring surrounding the second plurality of radial apertures and the fastener.

In some aspects, the techniques described herein relate to a percussion tool, wherein each of the first plurality of radial apertures is aligned with one of the second plurality of radial apertures in a length direction of the second shuttle portion.

In some aspects, the techniques described herein relate to a percussion tool, wherein each of the first plurality of radial apertures is positioned between adjacent radial apertures of the second plurality of radial apertures.

In some aspects, the techniques described herein relate to a percussion tool, wherein the second shuttle portion includes a first plurality of radial apertures positioned adjacent a first end thereof and a second plurality of radial apertures adjacent a second end thereof, wherein each of the first plurality of radial apertures and the second plurality of radial apertures are configured to overlie one of a plurality of elongated air vents in the spindle, and wherein the fastener extends through one of the second plurality of radial apertures and one of the plurality of elongated air vents into a bore of the anvil.

In some aspects, the techniques described herein relate to a percussion tool adapted to impart axial impacts to a tool bit, the percussion tool including: a housing; a motor supported by the housing; a spindle supported by the housing and including a plurality of radial air vents; a reciprocation mechanism operable to create a variable pressure air spring within the spindle; a striker received within the spindle for reciprocation in response to a pressure of the variable pressure air spring; an anvil received within the spindle and configured to be impacted by the striker, the anvil configured to transmit axial impacts from the striker to the tool bit; a chuck for securing the tool bit to the spindle; and a parking assembly movable relative to the spindle to selectively open and close the plurality of radial air vents, the parking assembly including a seat coupled to the spindle, a shuttle movable relative to an outer surface of the spindle, the shuttle including a first end, a second end opposite the first end, an inner surface that extends between the first end and the second end, and an annular recess in the inner surface adjacent the first end, an elastomeric ring positioned within the annular recess, a biasing member positioned between the seat and the shuttle, and a fastener that couples the shuttle to the anvil, wherein shuttle is movable between a working position, in which the plurality of radial air vents is closed by the elastomeric ring, and an idle position, in which the plurality of radial air vents is open, and wherein the biasing member is configured to bias the shuttle into the idle position.

In some aspects, the techniques described herein relate to a percussion tool, wherein the shuttle includes a first plurality of radial apertures positioned between the first end and the second end and a second plurality of radial apertures between the first plurality of radial apertures and the second end, wherein each of the first plurality of radial apertures and the second plurality of radial apertures are configured to overlie one of a plurality of elongated air vents in the spindle, and wherein the fastener extends through one of the second plurality of radial apertures and one of the plurality of elongated air vents into a bore of the anvil.

In some aspects, the techniques described herein relate to a percussion tool, wherein the first plurality of radial apertures is positioned between a first flange and a second flange and the second plurality of radial apertures is positioned between the second flange and a third flange, wherein the biasing member extends between the seat and the first flange, wherein the parking assembly further includes a second elastomeric ring positioned between the second flange and the third flange, and wherein the second elastomeric ring surrounds the second plurality of radial apertures and the fastener.

In some aspects, the techniques described herein relate to a method of creating a variable pressure air spring in a percussion tool adapted to impart axial impacts to a tool bit, the percussion tool including a spindle including a plurality of radial air vents, a striker received within the spindle for reciprocation in response to a pressure of the variable pressure air spring, an anvil received within the spindle and configured to be impacted by the striker, the anvil configured to transmit axial impacts from the striker to the tool bit, the method including: exerting, by the striker, a force on the anvil in a first direction; moving a shuttle in the first direction, the shuttle having a first shuttle portion, a second shuttle portion coupled to the anvil, and an elastomeric ring positioned between the first shuttle portion and the second shuttle portion; and covering the plurality of radial air vents in the spindle with a first shuttle portion to create the variable pressure air spring.

In some aspects, the techniques described herein relate to a method, wherein the first shuttle portion is formed from a first material, and wherein the second shuttle portion is formed from a second material, and wherein the first material is plastic and the second material is metal.

In some aspects, the techniques described herein relate to a method, wherein the elastomeric ring contacts the first shuttle portion and the second shuttle portion.

In some aspects, the techniques described herein relate to a method, further including absorbing, by the elastomeric ring, impact energy from the anvil during reciprocation.

In some aspects, the techniques described herein relate to a method, wherein moving the shuttle in the first direction includes overcoming a bias of a biasing mechanism on the shuttle in a second direction.

In some aspects, the techniques described herein relate to a method, further including, when the force is removed from the anvil, moving the shuttle in a second direction, opposite the first direction, and uncovering the plurality of radial air vents in the spindle thereby venting air to atmosphere to dissipate the variable pressure air spring.

In some aspects, the techniques described herein relate to a method of creating a variable pressure air spring in a percussion tool adapted to impart axial impacts to a tool bit, the percussion tool including a spindle including a plurality of radial air vents, a striker received within the spindle for reciprocation in response to a pressure of the variable pressure air spring, and an anvil received within the spindle and configured to be impacted by the striker, the anvil configured to transmit axial impacts from the striker to the tool bit, the method including: exerting, by the striker, a force on the anvil in a first direction; moving a shuttle coupled to the anvil in the first direction; and covering the plurality of radial air vents in the spindle with an elastomeric ring positioned within the shuttle to create the variable pressure air spring.

In some aspects, the techniques described herein relate to a method, wherein moving the shuttle in the first direction includes overcoming a bias of a biasing mechanism on the shuttle in a second direction.

In some aspects, the techniques described herein relate to a method, further including, when the force is removed from the anvil, moving the shuttle in the second direction, opposite the first direction, and uncovering the plurality of radial air vents in the spindle thereby venting air to atmosphere to dissipate the variable pressure air spring.

In some aspects, the techniques described herein relate to a method, wherein the shuttle includes a plurality of radial apertures, and wherein the shuttle is coupled to the anvil with a fastener that extends from a bore in the anvil into one of the plurality of radial apertures.

In some aspects, the techniques described herein relate to a percussion tool adapted to impart axial impacts to a tool bit, the percussion tool including: a housing; a motor supported by the housing; a spindle supported by the housing and including a plurality of radial air vents; a reciprocation mechanism operable to create a variable pressure air spring within the spindle; an anvil received within the spindle for reciprocation in response to a pressure of the variable pressure air spring, the anvil imparting axial impacts to the tool bit; a chuck for securing the tool bit to the spindle; and a parking assembly movable relative to the spindle to selectively open and close the plurality of radial air vents, the parking assembly including a seat coupled to the spindle and having a circumferential wall extending therefrom, the circumferential wall spaced apart from an outer surface of the spindle and surrounding the plurality of radial air vents, a plastic shuttle portion movable relative to the outer surface of the spindle, a biasing member positioned between the seat and the plastic shuttle portion, a metal shuttle portion movable relative to the outer surface of the spindle, a metal bushing positioned within the spindle and configured to receive a portion of the anvil, and a metal fastener that couples the metal shuttle portion to the metal bushing, wherein the plastic shuttle portion and the metal shuttle portion are movable together between a working position in which the plurality of radial air vents are closed and an idle position in which the plurality of radial air vents is open, and wherein the biasing member is configured to bias the plastic shuttle portion and the metal shuttle portion into the idle position.

In some aspects, the techniques described herein relate to a percussion tool, wherein the parking assembly further includes an elastomeric ring positioned between the plastic shuttle portion and the metal shuttle portion.

In some aspects, the techniques described herein relate to a percussion tool, wherein the plastic shuttle portion includes a flange and a circumferential wall extending axially from the flange, wherein the metal shuttle portion includes a first end and a second end opposite the first end, and wherein the elastomeric ring is positioned between the outer surface of the spindle and the circumferential wall of the plastic shuttle portion and also between the flange of the plastic shuttle portion and the first end of the metal shuttle portion.

In some aspects, the techniques described herein relate to a percussion tool, wherein the metal shuttle portion includes a first flange positioned at or adjacent to the first end, a second flange positioned at or adjacent to the second end, a third flange positioned between the first end and the second end, a first plurality of radial apertures positioned between the first flange and the third flange, and a second plurality of radial apertures positioned between the third flange and the second flange, wherein each of the first plurality of radial apertures and the second plurality of radial apertures are configured overlie one of a plurality of elongated air vents in the spindle, and wherein the metal fastener extends through one of the second plurality of radial apertures and one of the plurality of elongated air vents into an aperture of the metal bushing.

In some aspects, the techniques described herein relate to a percussion tool, wherein the elastomeric ring is a first elastomeric ring, and wherein the parking assembly further includes a second elastomeric ring positioned between the third flange and the second flange, the second elastomeric ring surrounding the second plurality of radial apertures and the metal fastener. Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
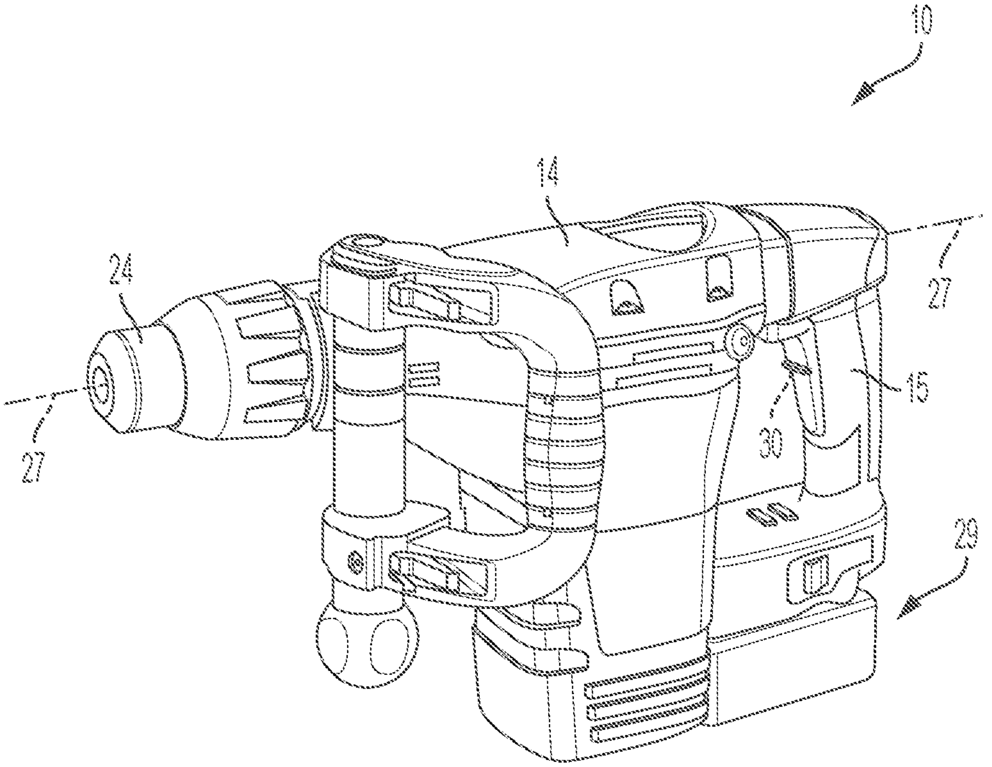
FIG. 1 is a perspective view of a percussion tool including an outer housing, an inner housing, an impact mechanism, and a parking assembly according to an embodiment of the invention.
Figure 2:
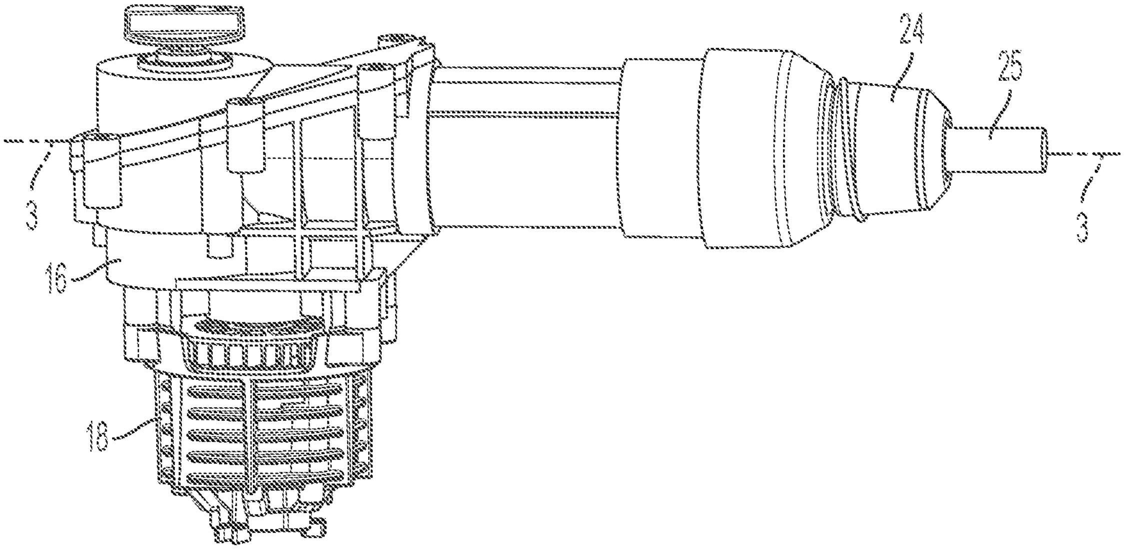
FIG. 2 is a side view of the percussion tool with the outer housing removed.

FIG. 1 illustrates a reciprocating percussive power tool, such as a percussion tool, breaker, or demolition hammer (e.g., hammer) 10, according to an embodiment of the invention. With respect of FIGS. 1-3, the hammer 10 includes an outer housing 14 having a handle 15, an inner housing 16 positioned within the outer housing 14, a motor 18 disposed within the housing 14, and a spindle 22. In the illustrated embodiment, the hammer 10 includes chuck 24 coupled to the spindle 22 to facilitate quick removal and replacement of a tool bit 25 (e.g., a chisel). The hammer 10 defines a tool bit axis 27 along which the tool bit 25 is reciprocated.

In the illustrated embodiment, the motor 18 is configured as a brushless direct-current (BLDC) electric motor that receives power from an on-board power source 29 (e.g., a battery; FIG. 1). The battery may include any of a number of different nominal voltages (e.g., 12V, 18V, etc.), and may be configured having any of a number of different chemistries (e.g., lithium-ion, nickel-cadmium, etc.). In some embodiments, the battery is a battery pack removably coupled to the housing. In other embodiments, the motor 18 may be powered by a remote power source (e.g., a household electrical outlet or a portable DC power source) through a power cord (not shown). The motor 18 is selectively activated by depressing an actuating member, such as a trigger 30, which in turn actuates an electrical switch (not shown). The switch is electrically connected to the motor 18 via a top-level or master controller, or one or more circuits, for controlling operation of the motor 18.

Figure 3:
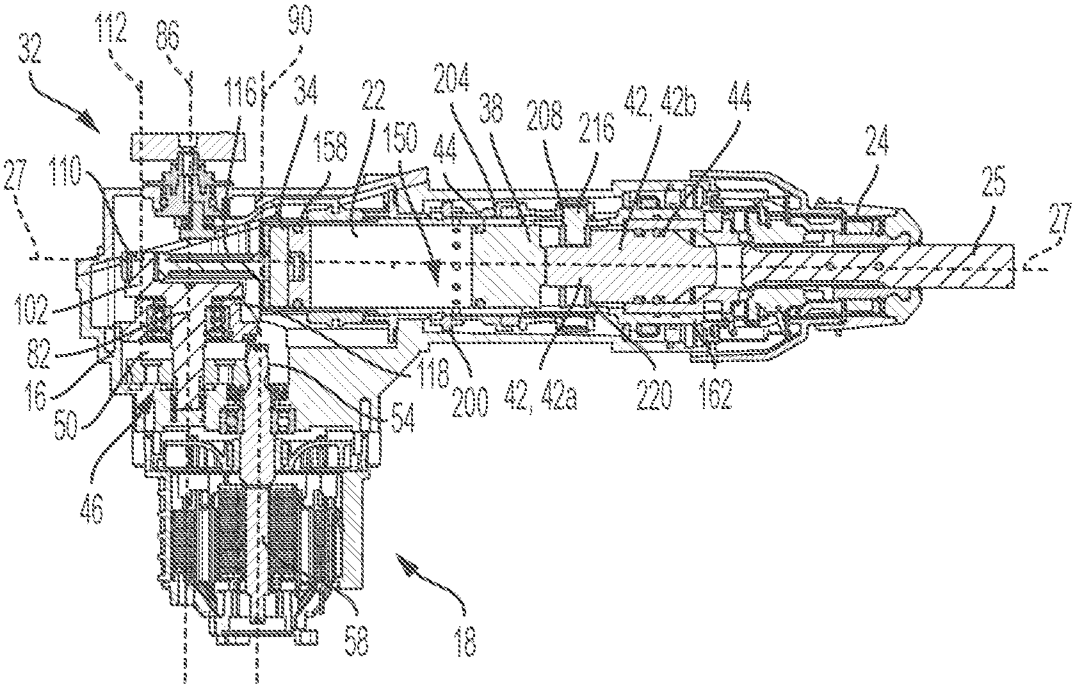
FIG. 3 is a cross-sectional view of a portion of the percussion tool of FIG. 1 along the line 3-3 of FIG. 2.
Figure 4:
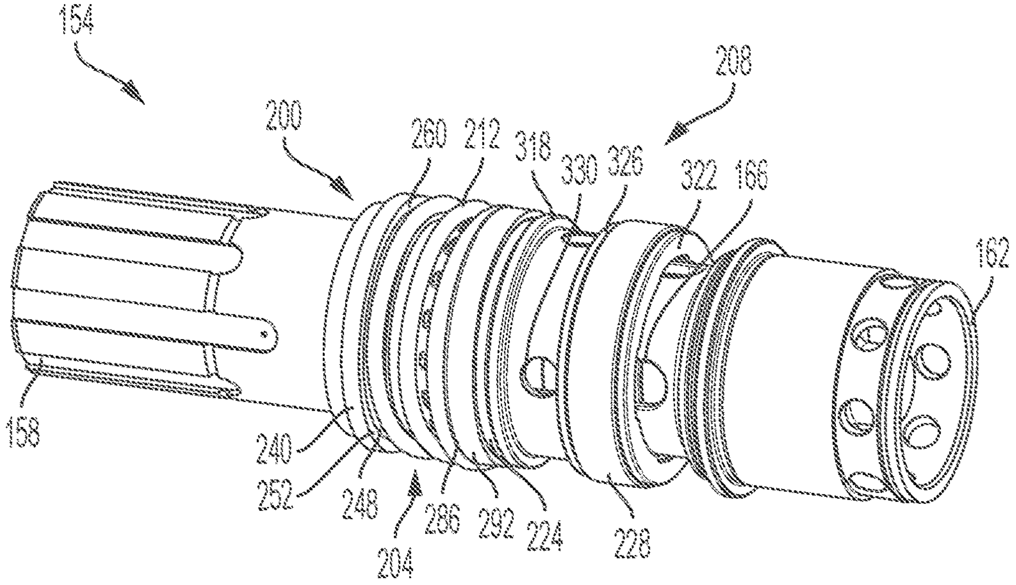
FIG. 4 is a perspective view of a portion of the impact mechanism and the parking assembly of FIG. 1.
Figure 6:
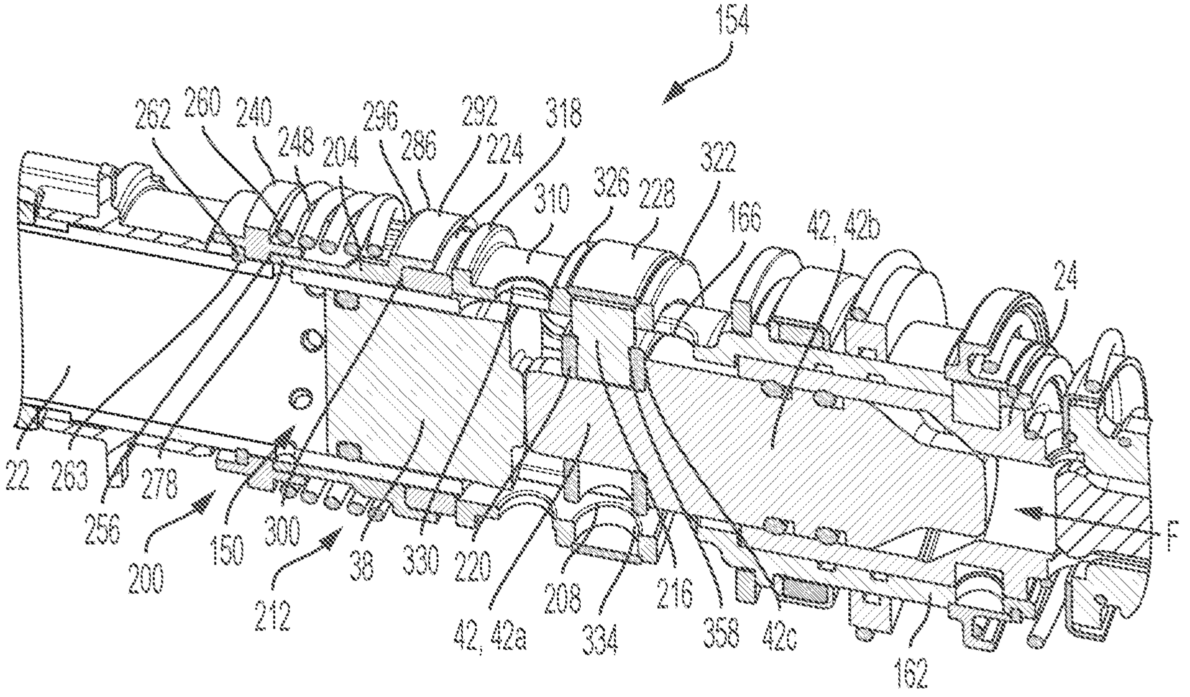
FIG. 6 is a cross-sectional view of a portion of the impact mechanism and the parking assembly of FIG. 2 along the line 3-3 of FIG. 1, the parking assembly being in a working position.

With respect to FIG. 3, the hammer 10 further includes an impact mechanism 32 supported within the inner housing 16. The impact mechanism 32 has a reciprocating piston 34 disposed within the spindle 22, a striker 38 that is selectively reciprocable within the spindle 22 in response to reciprocation of the piston 34, and an anvil 42 that is impacted by the striker 38 when the striker 38 reciprocates toward the tool bit 25. Each of the striker 38 and the anvil 42 is positioned within the spindle 22 and sealed against the same using one more sealing rings 44 (e.g., O-rings). As shown, the anvil 42 has a first portion **42*a*, a second portion 42*b* that has a larger dimension (e.g., outer diameter) that the first portion 42*a*, and a lip 42*c* positioned between the first portion 42*a* and the second portion 42*b* (FIG. 6**).

With reference to FIG. 3, torque from the motor 18 is transferred to the spindle 22 by a transmission 46. In the illustrated embodiment of the hammer 10, the transmission 46 includes a crank gear 50 engaged with a pinion 54 on an output shaft 58 of the motor 18. As shown, the crank gear 50 is rotatably supported within the housing 14 on a stationary shaft 82, which defines a central axis 86 that is offset from a rotational axis 90 of the output shaft 58 and pinion 54. As shown in FIG. 3, the respective axes 86, 90 of the stationary shaft 82 and output shaft 58 are parallel. The impact mechanism 32 also includes a crank shaft 102 rotatably supported on the stationary shaft 82 and having an eccentric pin 110 oriented along an eccentric axis 112, which is parallel to the axes 86, 90. The impact mechanism 32 further includes a connecting rod 116 interconnecting the piston 34 and the eccentric pin 110. The hammer 10 includes a clutch mechanism 118 arranged between and/or proximate the crank gear 50 and crank shaft 102. The clutch mechanism 118 is switchable between a first state, in which the crank shaft 102 is coupled for rotation with the crank gear 50, and a second state, in which the crank shaft 102 is disengaged from and/or decoupled for rotation with the crank gear 50.

In operation, an operator presses the tool bit 25 against the workpiece and depresses the trigger 30 to activate the motor 18. Rotation of the pinion 54 also causes the crank gear 50 to rotate about the stationary shaft 82. Thus, the crank shaft 102 receives torque from the crank gear 50, causing the crank shaft 102 and the eccentric pin 110 to rotate about the central axis 86. Rotation of the eccentric pin 110 causes the piston 34 to reciprocate within the spindle 22 via the connecting rod 116, which causes the striker 38 to impart axial impacts to the anvil 42, which in turn are transferred to the tool bit 25, causing it to reciprocate against a workpiece provided the user continues to press the tool bit 25 against the workpiece. Specifically, a variable pressure air pocket (or an air spring) is developed between the piston 34 and the striker 38 when the piston 34 reciprocates within the spindle 22, whereby expansion and contraction of the air spring induces reciprocation of the striker 38. The impact between the striker 38 and the anvil 42 is then transferred to the tool bit 25, causing it to reciprocate for performing work on the workpiece.

Figure 9:
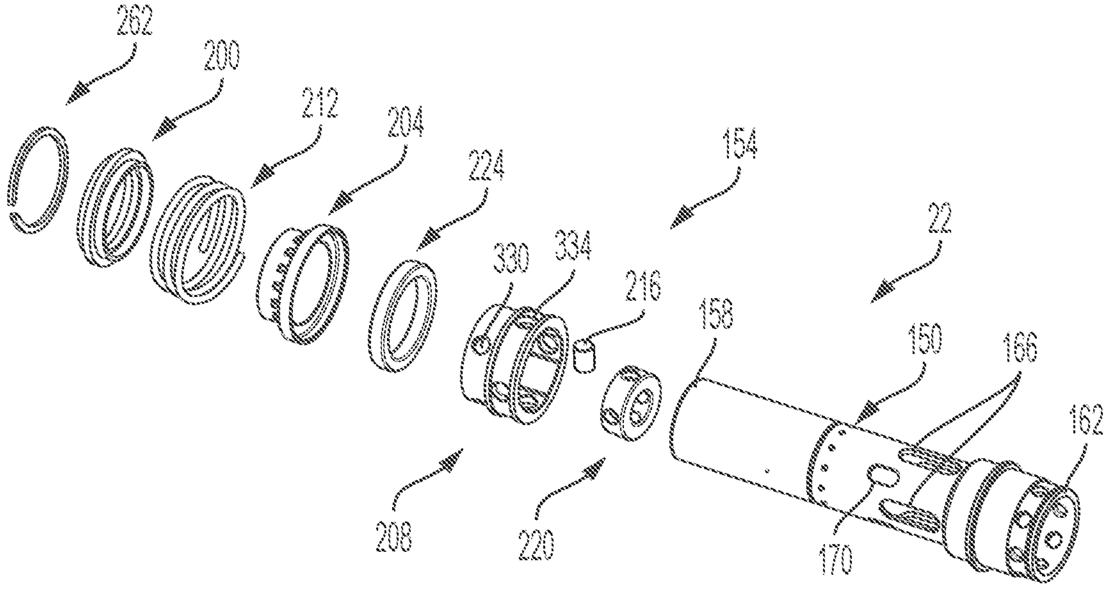
FIG. 9 is an exploded view of the portion of the impact mechanism and the parking assembly of FIG. 8.
Figure 10:
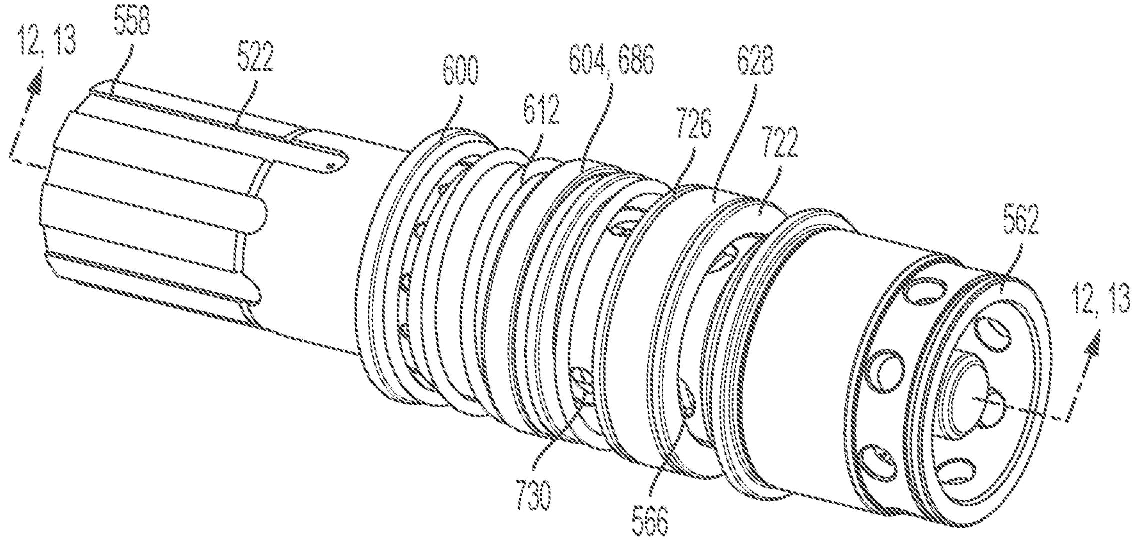
FIG. 10 is a perspective view of a portion of an impact mechanism and a parking assembly for use with the percussion tool of FIG. 1 and according to another embodiment of the invention.
Figure 11:
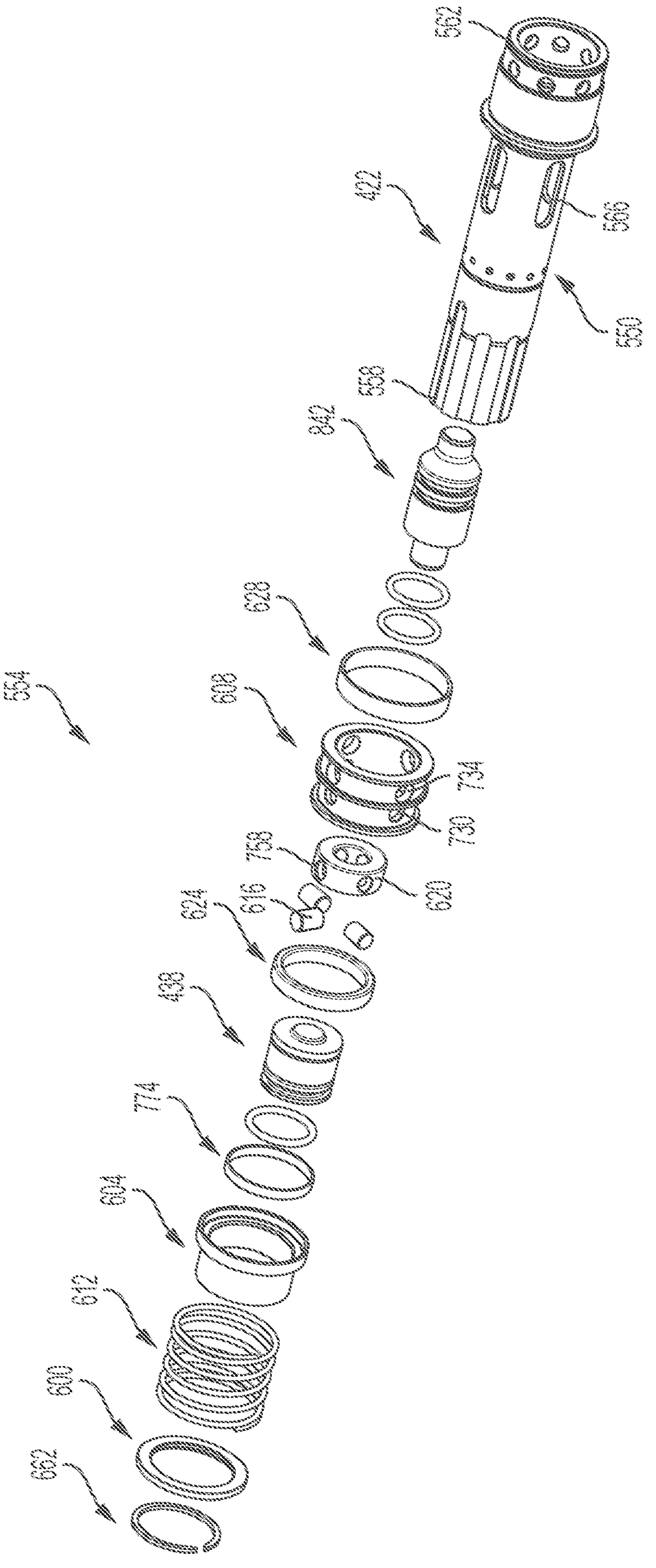
FIG. 11 is an exploded view of the portion of the impact mechanism and the parking assembly of FIG. 10.
Figure 12:
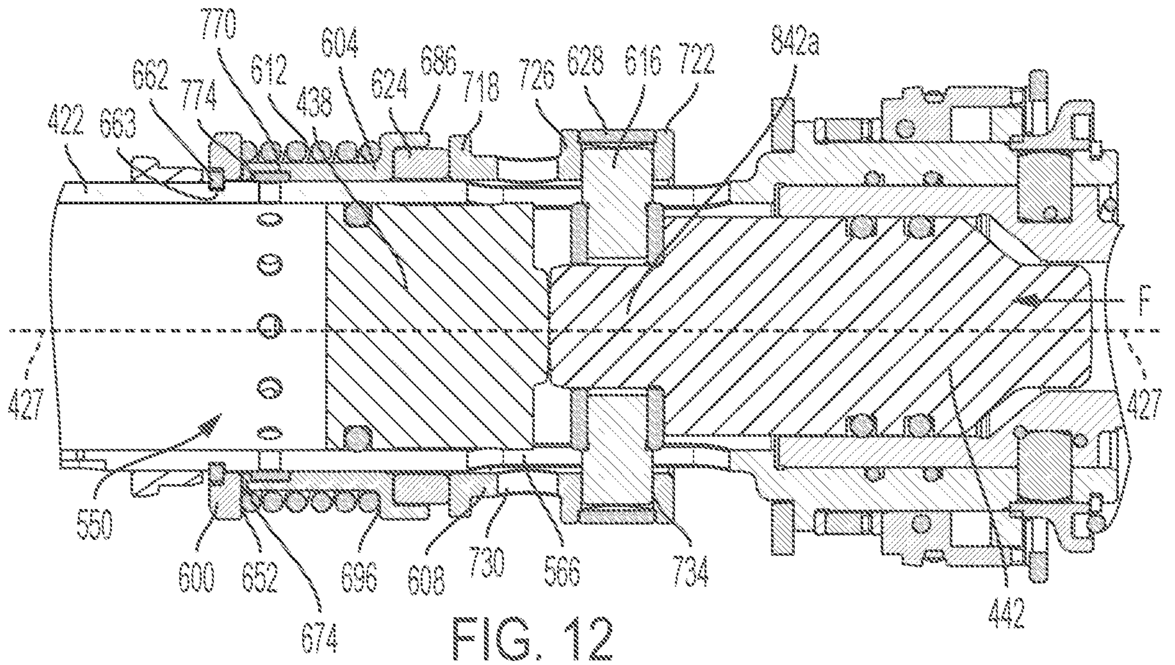
FIG. 12 is a cross-sectional view of a portion of the impact mechanism and the parking assembly of FIG. 10 along the line 12-12 of FIG. 10, the parking assembly being in a working position.
Figure 13:
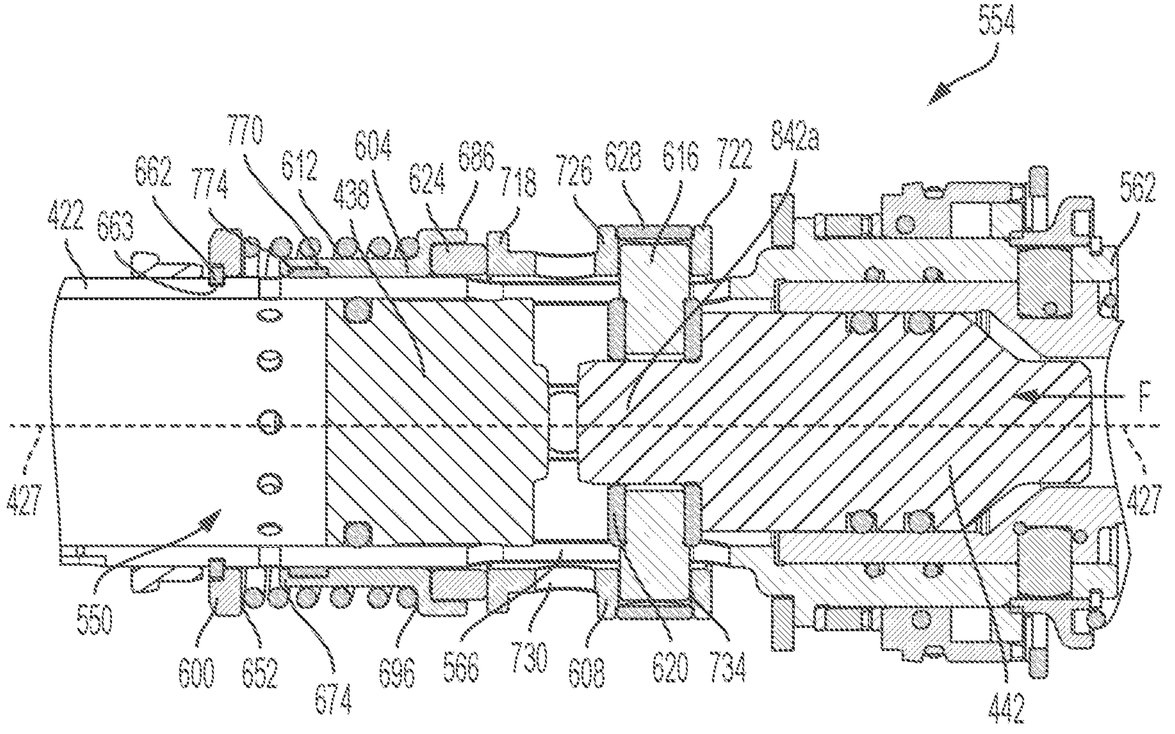
FIG. 13 is a cross-sectional view of a portion of the impact mechanism and the parking assembly of FIG. 1 along the line 13-13 of FIG. 10, the parking assembly being in an idle position.
Figure 14:
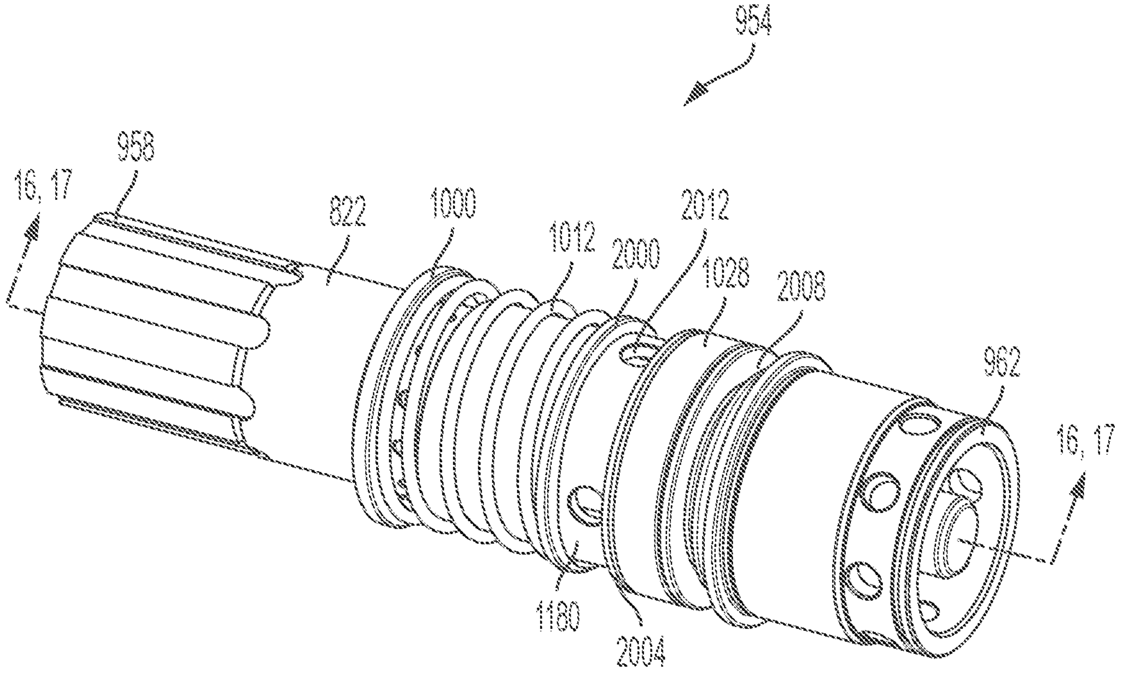
FIG. 14 is a perspective view of a portion of an impact mechanism and a parking assembly for use with the percussion tool of FIG. 1 and according to another embodiment of the invention.
Figure 15:
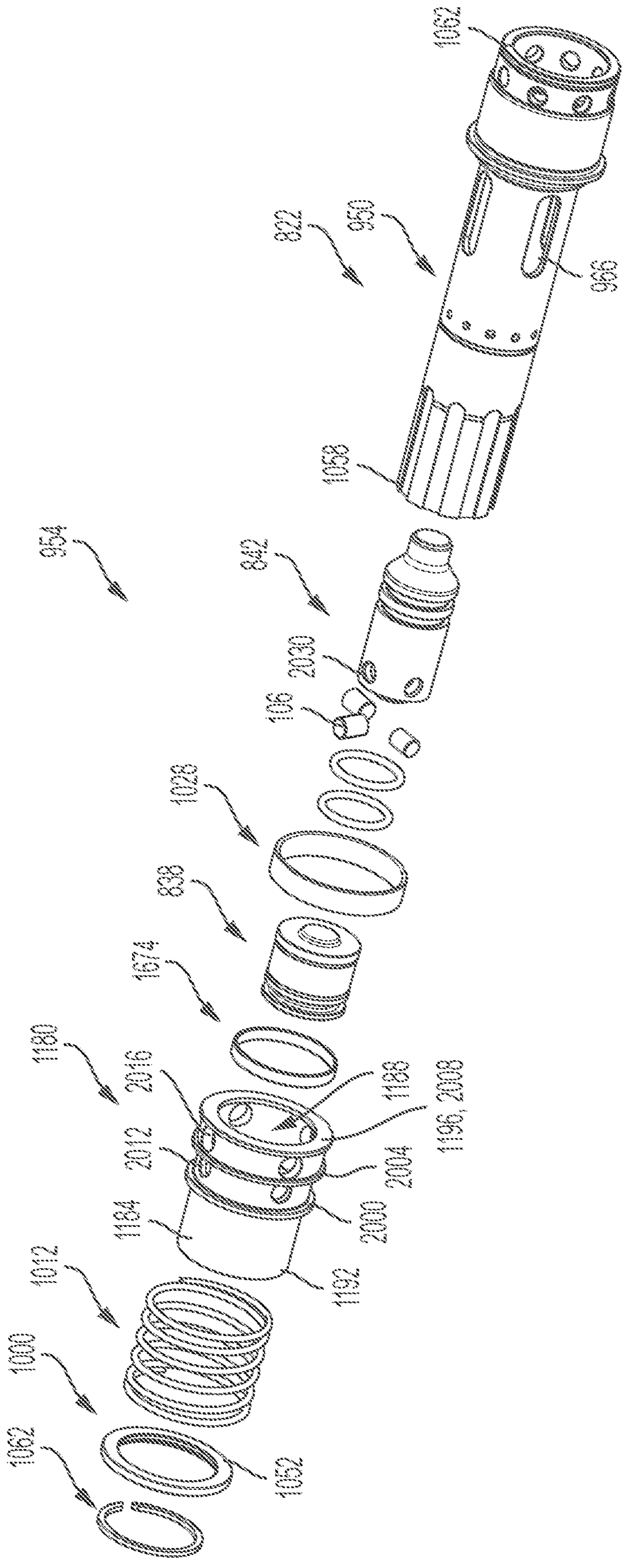
FIG. 15 is an exploded view of the portion of the impact mechanism and the parking assembly of FIG. 14.
Figure 16:
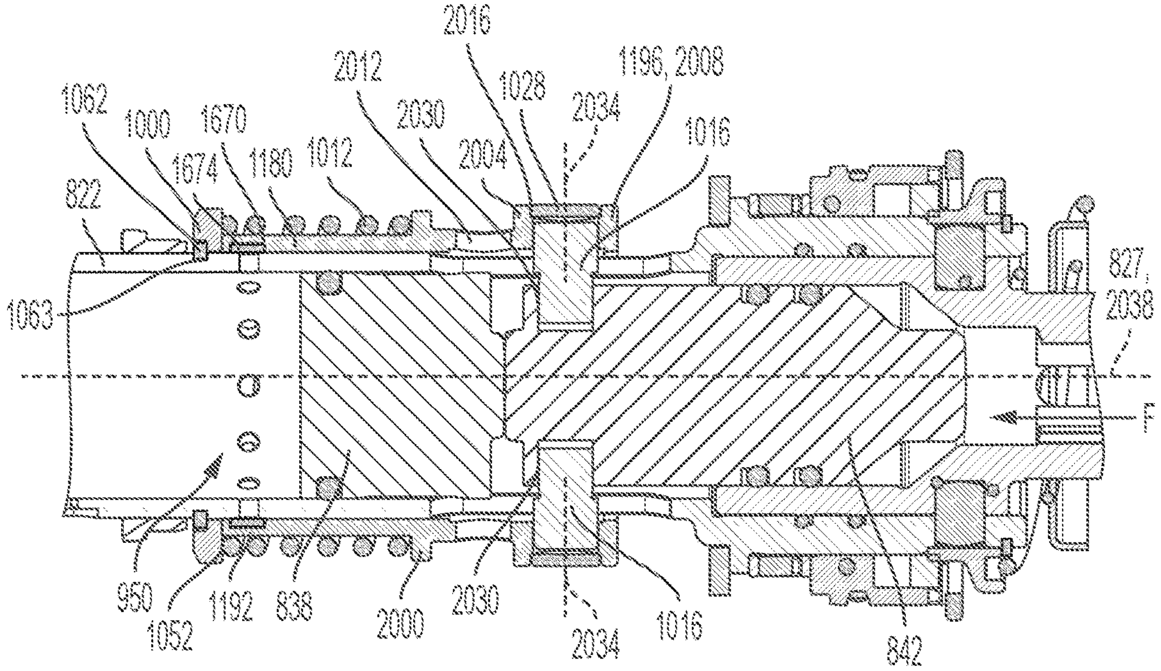
FIG. 16 is a cross-sectional view of the portion of the impact mechanism and the parking assembly of FIG. 14 along the line 16-16 of FIG. 14, the parking assembly being in a working position.
Figure 17:
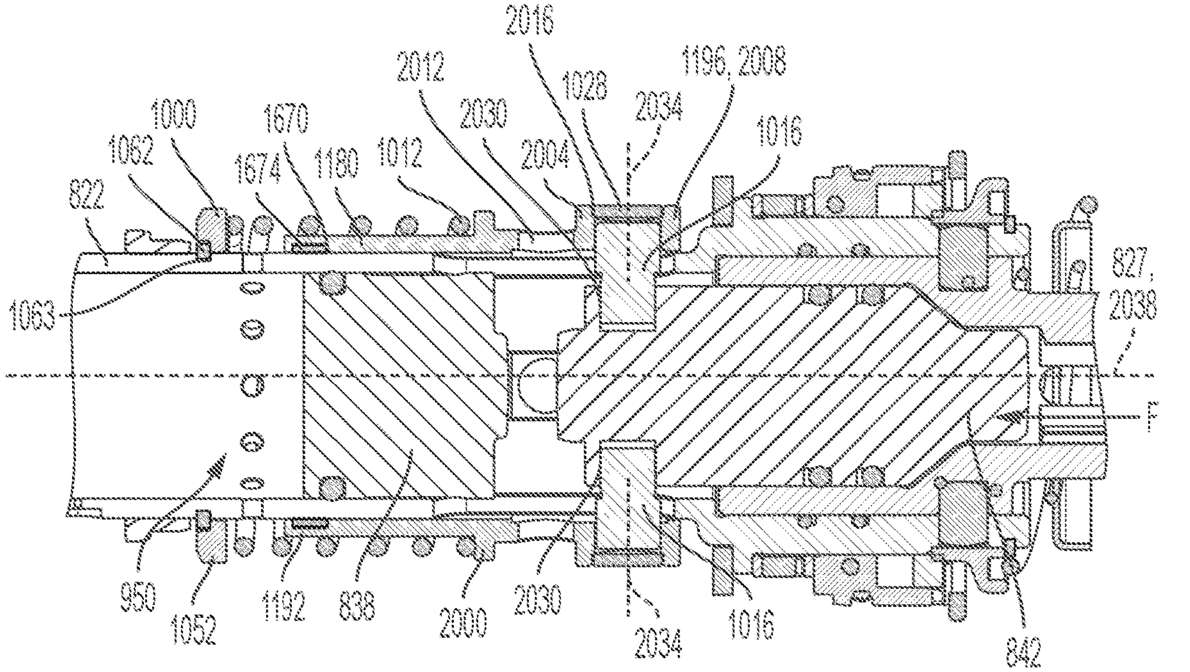
FIG. 17 is a cross-sectional view of the portion of the impact mechanism and the parking assembly of FIG. 14 along the line 17-17 of FIG. 14, the parking assembly being in an idle position.

As shown in FIGS. 5-7 and 9, the spindle 22 has a plurality of radial air vents 150 (e.g., holes or apertures) that is selectively opened and closed by a parking assembly 154 to create the air spring. The spindle 22 includes a first end 158 and a second end 162 opposite the first end 158. The first end 158 is configured to receive the piston 34, and the anvil 42 is positioned adjacent the second end 162. The radial air vents 150 are positioned between the first end 158 and the second end 162. As shown in FIGS. 4-7, the spindle 22 also includes a plurality of elongated air vents 166 extending along a length of the spindle 22. Moreover, the elongated air vents 166 are spaced apart from one another about a circumference of the spindle 22 at regular intervals. The elongated air vents 166 are positioned between the radial air vents 150 the second end 162. In some embodiments, as shown in FIG. 9, the spindle 22 may also include a plurality of intermediate air vents 170. When present, the intermediate air vents 170 are spaced apart from one another about the circumference of the spindle 22 at regular intervals. The intermediate air vents 170 are staggered relative to the elongated air vents 166. As shown, each of the intermediate air vents 170 is positioned between the radial air vents 150 the second end 162.

With reference to FIGS. 3-7, the parking assembly 154 includes an annular seat 200, a two-piece annular shuttle having a first shuttle portion 204 and a second shuttle portion 208, a biasing member 212, a fastener 216 (e.g., a pin), a bushing 220, a first elastomeric ring 224, and a second elastomeric ring 228. The seat 200 is fixed to the spindle 22 adjacent the radial air vents 150. The radial air vents 150 are positioned between the seat 200 and the chuck 24. As shown, the seat 200 includes a generally cylindrical body 240 that defines an axial aperture 244 therethrough. A generally circumferential wall 248 extends from a surface 252 of the body 240. The wall 248 is concentric with the axial aperture 244. Also, the wall 248 is positioned between opposite edges of the surface of the body 240 such that an inner lip 256 is defined from an inner portion of the surface 252 and the wall 248 and an outer lip 260 is defined by an outer portion of the surface 252 and the wall 248. The spindle 22 is received within the axial aperture 244 of the body 240 such that the body 240 is coupled to an outer surface of the spindle 22. The body 240 of the seat 200 circumscribes the outer surface of the spindle 22 between the first end 158 of the spindle 22 and the radial air vents 150. A retaining clip 262 is positioned within a groove 263 in the outer surface of the spindle 22 and the body 240 abuts the retaining clip 262. The retaining clip 262 prevents reward movement of the seat 200. The wall 248 is spaced apart from the outer surface of the spindle 22 by the inner lip 256. The wall 248 surrounds the radial air vents 150 and is spaced from the outer surface of the spindle 22 in a radially outward direction to selectively permit a bi-directional airflow through the radial air vents 150.

Figure 5:
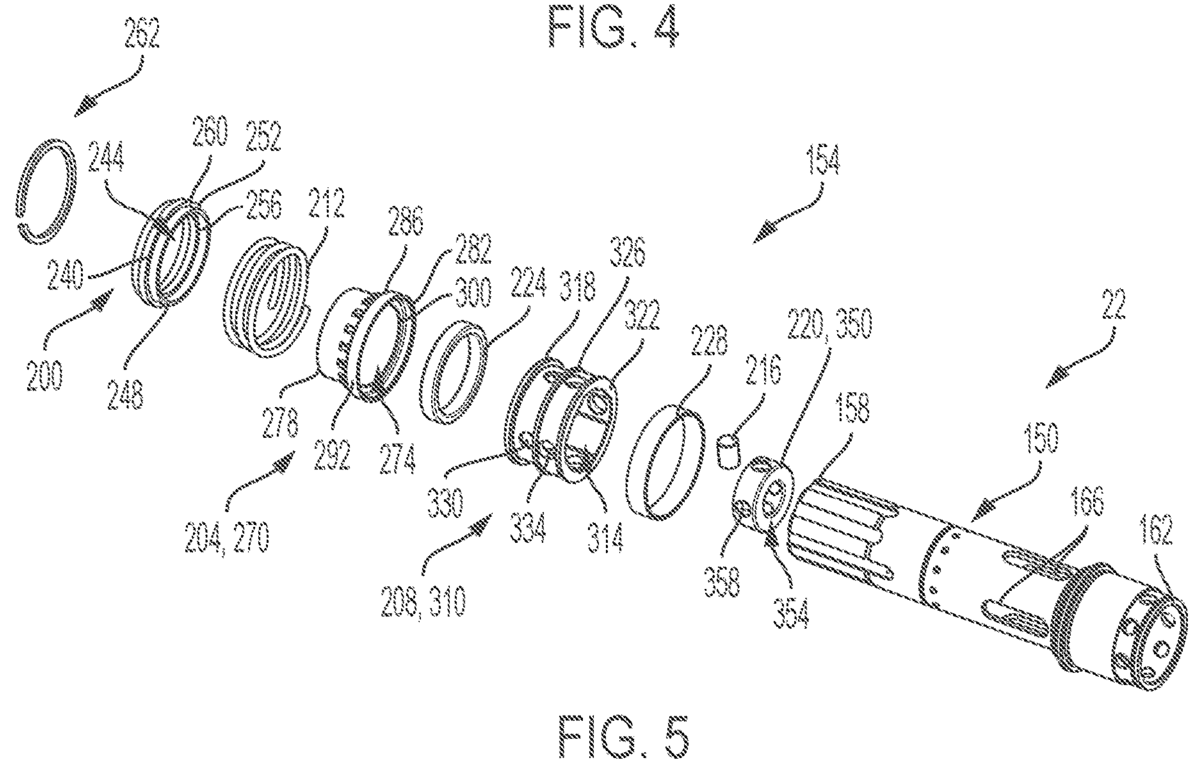
FIG. 5 is an exploded view of the portion of the impact mechanism and the parking assembly of FIG. 4.

The first shuttle portion 204 includes a hollow cylindrical body 270 that defines an axial aperture 274 therethrough. In the illustrated embodiments, the first shuttle portion 204 is formed from a plastic material, although other materials may be used. For example, in other embodiments, the first shuttle portion 604 may be formed from metal. The spindle 22 is received within the axial aperture 274 and the first shuttle portion 204 is selectively slidable relative to the outer surface of the spindle 22. The body 270 includes a first end 278 and a second end 282 opposite the first end 278 (FIG. 5). The first end 278 is sized to be selectively received between the outer surface of the spindle 22 and the wall 248 of the seat 200 to abut the inner lip 256 of the seat 200 (FIG. 6). The second end 282 defines a flange 286 extending outwardly therefrom and a circumferential wall 292 extending axially from a peripheral edge of the flange 286. The wall 292 is concentric with the axial aperture 274. The biasing member 212 (e.g., a compression spring) is positioned between the outer lip 260 of the seat 200 and a first surface 296 of the flange 286 of the first shuttle portion 204. The position of the seat 200 is maintained axially by the retaining clip 262 and the biasing member 212. The first elastomeric ring 224 is positioned between the wall 292 of the first shuttle portion 204 and the outer surface of the spindle 22, and is adjacent to and abuts a second surface 300 of the flange 286. The first elastomeric ring 224 contacts both the first shuttle portion 204 and the second shuttle portion 208.

With reference to FIGS. 4-7, the second shuttle portion 208 is coupled to the bushing 220 via the pin 216, and together, the second shuttle portion 208 and the bushing 220 are movable with the first shuttle portion 204 relative to the spindle 22. The second shuttle portion 208, the pin 216, and the bushing 220 are each formed from a metal material, such as steel, although other metal materials may be used. For example, in other embodiments, the second shuttle portion 208 may be formed from plastic. The second shuttle portion 208 includes a hollow cylindrical body 310 that defines an axial aperture 314 extending therethrough. The spindle 22 is received within the axial aperture 314, and the second shuttle portion 208 is slidable with the first shuttle portion 204 on the outer surface of the spindle 22. The body 310 includes a first end having a first flange 318 extending radially outwardly therefrom and a second end opposite the first end and having a second flange 322 extending radially outwardly therefrom. The first elastomeric ring 224 abuts the first flange 318. A third flange 326 extends radially outwardly from the body 310 and is positioned between the first flange 318 and the second flange 322. The body 310 also has a first portion and a second portion. The first portion is positioned at the first end and between the first flange 318 and the third flange 326. The second portion is positioned at the second end and extends between the third flange 326 to the second flange 322. The first portion has an outer diameter that is smaller than an outer diameter of the second portion. The first portion includes a plurality of radial apertures 330 that extend therethrough and are in communication with the axial aperture 314. The second portion also includes a plurality of radial apertures 334 that extend therethrough and are in communication with the axial aperture 314. The second elastomeric ring 228 is positioned between the third flange 326 and the second flange 322, and surrounds the second portion.

In the illustrated embodiment, therefore, the first shuttle portion 204 is constructed from a first material (e.g., plastic) that is different from a second material (e.g., metal) of the second shuttle portion 208. In other embodiments, the first shuttle portion 204 is constructed from a first material that may be the same as a second material of the second shuttle portion 208. For example, both the first shuttle portion 204 and the second shuttle portion 208 may be plastic or may be metal. Plastic may be preferred for one or both of the first and second shuttle portions 204, 208 in embodiments where weight savings and manufacturability are a priority, whereas metal may be preferred for these components in embodiments where durability is a priority.

Figure 7:
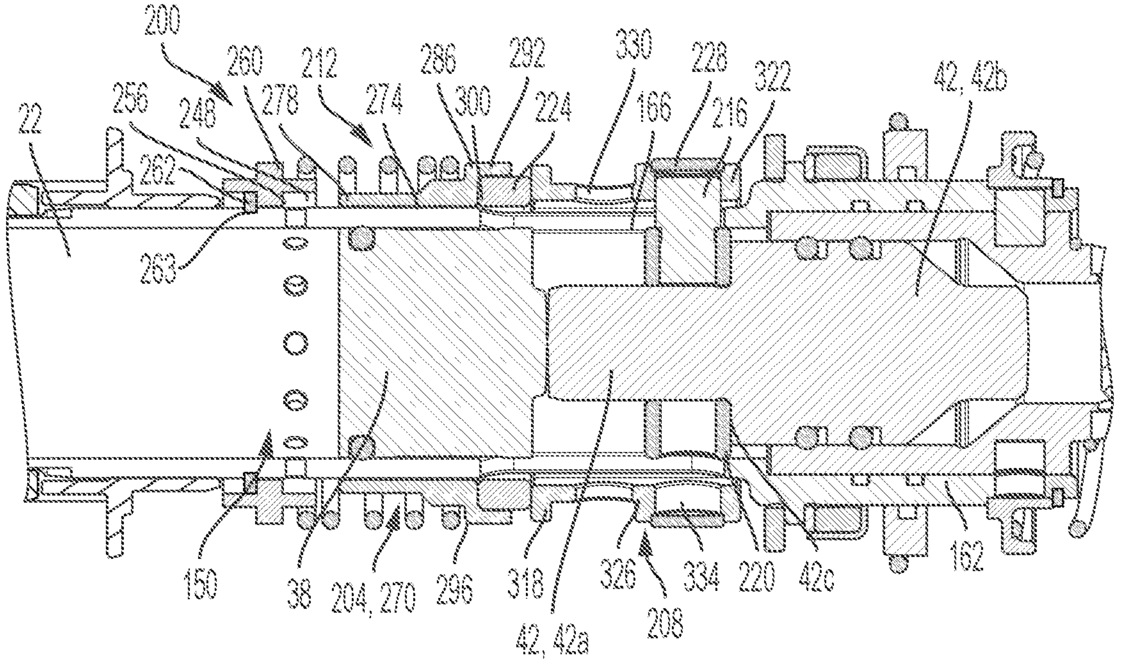
FIG. 7 is a cross-sectional view of a portion of the impact mechanism and the parking assembly of FIG. 1 along the line 3-3 of FIG. 2, the parking assembly being in an idle position.
Figure 8:
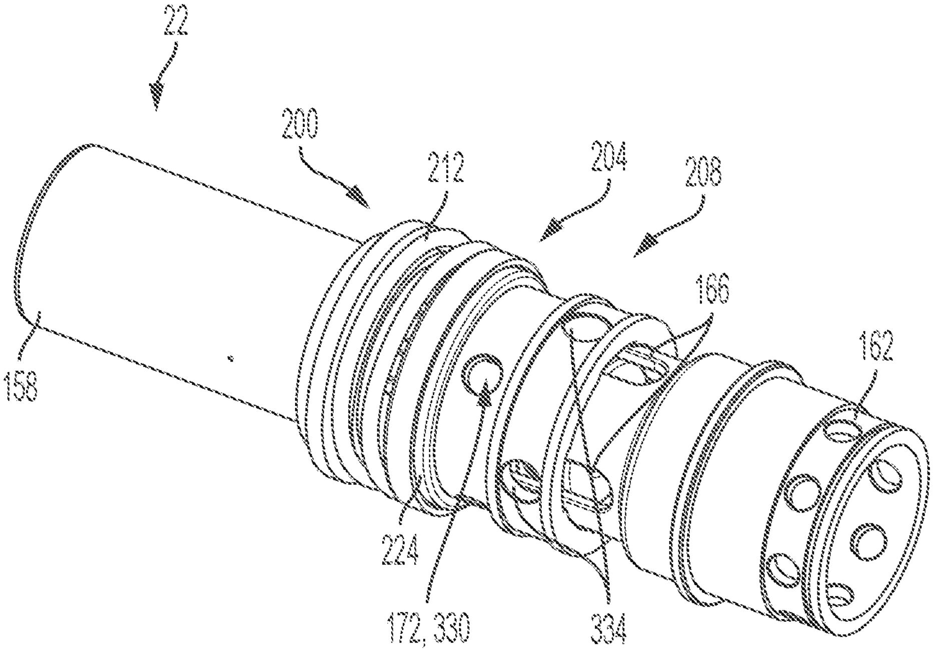
FIG. 8 is a perspective view of a portion of an impact mechanism and a parking assembly for use with the FIG. 1 and according to another embodiment of the invention.

As shown in FIGS. 4, 6, and 7-9, the second shuttle portion 208 overlaps the elongated air vents 166 (and the intermediate air vents 170) in the spindle 22. In the embodiment of FIGS. 4-7, the radial apertures 330 of the first portion and the radial apertures 334 of the second portion are axially aligned with one another in a length direction of the second shuttle portion 208. Also, each of the radial apertures 330, 334 of the first and second portions overlaps a corresponding elongated air vent 166, thereby providing fluid communication between an exterior of the parking assembly 154 and an interior of the spindle 22. In the embodiment of FIGS. 8-9, the radial apertures 330 of the first portion are radially offset relative the radial apertures 334 in the second portion. That is, each of the radial apertures 330 of the first portion is positioned between adjacent radial apertures 334 of the second portion. Also, each of the radial apertures 334 of the second portion overlaps a corresponding elongated air vent 166, and each of the radial apertures 330 of the first portion overlaps a corresponding intermediate air vent 170, thereby providing fluid communication between an exterior of the parking assembly 154 and an interior of the spindle 22. The overlapping radial apertures 330, 334 and elongated air vents 166, 170 permit a bi-directional airflow therethrough to vent an area between the striker 38 and the anvil 42 to atmosphere thereby preventing a buildup of pressure therebetween.

The bushing 220 is positioned within the spindle 22 and is movable relative to the anvil 42. As shown, the bushing 220 includes a generally cylindrical body 350 having an axial aperture 354 extending therethrough and a plurality of radial apertures 358 extending through the body 350 and in communication with the axial aperture 354. One of the radial apertures 358 of the bushing 220 is aligned with one of the radial apertures 334 of the second portion of the second shuttle portion 208. The pin 216 is received and secured within the aligned radial apertures 358, 330 to couple the second shuttle portion 208 to the bushing 220. As shown in FIGS. 6 and 7, the pin 216 radially extends through one of the elongated air vents 166 in the spindle 22 to couple the second shuttle portion 208 to the bushing 220. The axial aperture 354 of the bushing 220 is configured to receive the first portion 42*a* of the anvil 42. The first portion 42*a* of the anvil 42 is slidably received within the axial aperture 354 of the bushing such that the bushing 220 is configured to selectively abut the lip 42*c* of the anvil 42. The second elastomeric ring 228 is configured to cover the pin 216 and the radial apertures 334 in the second portion of the second shuttle portion 208.

The first shuttle portion 204 and the second shuttle portion 208 are movable together to selectively open and close the radial air vents 150, and thereby create and dissipate the air spring. The first shuttle portion 204 and the second shuttle portion 208 are movable together because they are sandwiched between the biasing member 212 and the anvil 42 (e.g., the lip 42*c* of the anvil 42). The first elastomeric ring 224 positioned between the first shuttle portion 204 (e.g., the flange 286 thereof) and second shuttle portion 208 (e.g., the first flange 318 thereof) absorbs impact energy from the anvil 22 during a chiseling operation.

Specifically, the first shuttle portion 204 and the second shuttle portion 208 are movable together between a working position (FIGS. 3 and 6) in which the radial air vents 150 are closed and the air spring is created, and an idle position (FIG. 7), in which the radial air vents 150 are open and the air spring is dissipated and an unable to form to otherwise impart a force upon the striker 38. The biasing member 212 biases the first shuttle portion 204 forward to the idle position shown in FIG. 7.

As shown in FIG. 6, when the operator presses the tool bit 25 against the workpiece, the tool bit 25 imparts a normal force in the direction of arrow F, which causes the anvil 42 to move in the direction of arrow F. As the anvil 42 moves in the direction of arrow F, the lip 42*c* of the anvil 42 engages the bushing 220 to move the bushing 220 in the direction of arrow F. Because the bushing 220 is coupled to the second shuttle portion 208 via the pin 216, movement of the bushing 220 in the direction of arrow F also moves the second shuttle portion 208 and the first shuttle portion 204 against the bias of the biasing member 212 into the working position shown in FIG. 6. In the working position, the first shuttle portion 204 covers or overlies the radial air vents 150, ensuring that air is sealed within the spindle 22 between the piston and striker 18 to create the air spring. Specifically, the first shuttle portion 204 abuts the inner lip 256 of the seat 200 such that the first shuttle portion 204 is positioned between the wall of the seat 200 and the outer surface of the spindle 22, thereby covering the radial air vents 150. Therefore, the wall 248 of the seat 200 clamps the corresponding first shuttle portion 204 against the spindle 22 to effectively cover the radial air vents 150 and prevent leakage of air through the radial air vents 150 while the first shuttle portion 604 is in the working position.

When the hammer 10 and tool bit 25 are lifted from the workpiece, the final impact upon the anvil 42 pushes it forward into the chuck 24, where the anvil 42 remains. Without the anvil 42 abutted with the bushing 220 and the pin 216, the biasing member 212 between the seat 200 and first shuttle portion 204 rebounds, pushing the first shuttle portion 204 forward to the idle position shown in FIG. 7 to uncover the radial air vents 150. With the radial air vents 150 unblocked, the air within the spindle 22 is vented to atmosphere, preventing the air spring from developing and parking the striker 38 within the spindle 22 such that it cannot further reciprocate within the spindle 22.

Another parking assembly 554 is shown in FIGS. 10-13. The parking assembly 554 of FIGS. 10-13 is similar to the parking assembly 154. Therefore, like components will be identified with like reference numerals plus "400" and only the differences will be discussed herein. Like the seat 200 of FIGS. 10-13, the seat 600 of FIGS. 10-14 is positioned on the spindle 22 adjacent the radial air vents 550 and abuts the retaining clip 662. As shown, the generally circumferential wall 648 is omitted from the outer surface 652 of the body 640. Accordingly, the spring 612 extends between the surface 652 of the seat 600 and the first surface 696 of the first flange 686 of the first shuttle portion 604. Additionally, in this embodiment, an inner surface of the body 670 of the first shuttle portion 604 includes an annular recess 770 adjacent to the first end 674 thereof. Positioned within the recess 770 is a third elastomeric ring 774. The spindle 422 is received within the axial aperture 678. The first shuttle portion 604, with the third elastomeric ring 774, is selectively slidable relative to the outer surface of the spindle 422. That is, the third elastic ring 774 is movable with the first shuttle portion 604. The third elastomeric ring 774 is configured to cover the radial air vents 550 when the first shuttle portion 604 is in the working position. A width of the third elastomeric ring 774 is wider than an outer diameter of the radial air vents 550. Therefore, the third elastomeric ring 774 is configured to prevent leakage of air through the radial air vents 550 while the first shuttle portion 604 is in the working position. In the illustrated embodiment, there are three pins 616 as opposed to a single pin 216 in the earlier embodiments. That is, there is one pin 616 in an aligned radial aperture 734 of the second shuttle portion 608 and radial aperture 758 of the bushing 620. In other embodiments, there may be more or fewer of each of these components.

Another parking assembly 954 is shown in FIGS. 14-17. The parking assembly 954 of FIGS. 14-17 is similar to the parking assembly 154. Therefore, like components will be identified with like reference numerals plus "800" and only the differences will be discussed herein. As shown, in this embodiment, the parking assembly 954 includes a one-piece annular shuttle 1180, rather than a two-piece annular shuttle 204, 208. Accordingly, the first elastomeric ring 224 is omitted. The one-piece shuttle 1180 includes a hollow cylindrical body 1184 that defines an axial aperture 1188 therethrough. The shuttle 1180 may be formed from plastic or metal. The spindle 822 is received within the axial aperture 1188 and the shuttle 1180 is selectively slidable relative to the outer surface of the spindle 822. The body 1184 includes a first end 1192 and a second end 1196 opposite the first end 1192. The axial aperture 1188 extends through the body 1184 between the first end 1192 and the second end 1196.

The shuttle 1180 has three flanges extending from the outer surface thereof. A first flange 2000 is positioned between the first end 1192 and the second end 1196. A second flange 2004 is positioned between the first flange 2000 and the second end 1196. A third flange 2008 is positioned at or adjacent second end 1196. A first plurality of radial apertures 2012 radially extend through the body 1184. The radial apertures 2012 are positioned between the first flange 2000 and the second flange 2004. A second plurality of radial aperture 2016 extend radially through the body 1184. The radial apertures 2016 are positioned extend between the second flange 2004 and the third flange 2008. In the illustrated embodiment, each of the radial apertures 2012 is aligned with one of the radial apertures 2016 along a length of the shuttle 1180. In other embodiments, each of the radial apertures 2012 may be positioned between adjacent radial apertures 2016 such that the radial apertures 2012 are staggered relative to the radial apertures 2016. The biasing member 1012 (e.g., a compression spring) is positioned between the front surface 1052 of the seat 1000 and a first (i.e., rear) surface of the first flange 2000 of the shuttle 1180.

Additionally, in this embodiment, an inner surface of the body 1184 of the shuttle 1180 includes an annular recess 1670 adjacent the first end 1192 thereof. Positioned within the recess 1670 is a first elastomeric ring 1674. The shuttle 1180, with the first elastomeric ring 1674, is selectively slidable relative to the outer surface of the spindle 822. That is, the first elastomeric ring 1674 is movable with shuttle 1180. The first elastomeric ring 1674 is configured to cover the radial air vents 950 when the shuttle 1180 is in the working position. A width of the third elastomeric ring 1674 is wider than an outer diameter of the radial air vents 950. Therefore, the first elastomeric ring 1674 is configured prevent leakage of air through the radial air vents 950 while the shuttle 1180 is in the working position.

In the embodiment of FIGS. 14-17, the bushing 220 is omitted. Instead, the anvil 842 has a plurality of bores 2030, which are arranged circumferentially about the anvil 842. Accordingly, each bore 2030 has an axis 2034 that is oriented transverse to a longitudinal axis 2038 of the anvil 842, which is parallel to the tool bit axis 827. When assembled, each of the bores 2030 is aligned with one of the radial apertures 2016. In the illustrated embodiment, one pin 1016 is positioned within each bore 2030 and extends into the corresponding aligned radial aperture 2016. As shown, each of the pins 1016 radially extends through a respective one of the elongated air vents 966 in the spindle 822 to couple the shuttle 1180 to the anvil 842. In the illustrated embodiment, there are three radial apertures 2016, three bores 2030, and three pins 1016. In other embodiments, there may be more or fewer of each of these components. The second elastomeric ring 1028 is configured to cover the pins 1016 and the radial apertures 2016 in the shuttle 1180, and therefore bias the pins 1016 in a radially inward direction into the bores 2030.

The shuttle 1180 is movable to selectively open and close the radial air vents 950, and thereby create and dissipate the air spring. That is, the shuttle is 1180 is movable between a working position (FIG. 16) in which the radial air vents 950 are closed and the air spring is created, and an idle position (FIG. 17), in which the radial air vents 950 are open and the air spring is dissipated and an unable to form to otherwise impart a force upon the striker 938. The biasing member 1012 biases the shuttle 1180 forward to the idle position, as discussed above.

When the operator presses the tool bit 825 against the workpiece, the tool bit 825 imparts a normal force in the direction of arrow F, which causes the anvil 842 to move in the direction of arrow F. As the anvil 842 moves in the direction of arrow F, the pins 1016 move with the anvil 842 in the direction of arrow F. Because the anvil 842 is coupled to the shuttle 1180 via the pins 1016, movement of the anvil 842 in the direction of arrow F also moves the shuttle 1180 against the bias of the biasing member 1012 into the working position shown in FIG. 16. In the working position, the shuttle 1180, and more specifically the first elastomeric ring 1674, covers or overlies the radial air vents 950, ensuring that air is sealed within the spindle 822 between the piston and striker 838 to create the air spring. Specifically, the shuttle 1180 abuts the surface 1052 of the seat 1000 such that the third elastomeric ring 1674 is positioned over the radial air vents 950.

When the hammer 810 and tool bit 825 are lifted from the workpiece, the final impact upon the anvil 842, and therefore the pins 1016, pushes it forward into the chuck 824, where the anvil 842 remains. The biasing member 1012 between the seat 1000 and shuttle 1180 rebounds, pushing the shuttle 1180 forward to the idle position (shown in FIG. 17) to uncover the radial air vents 950. With the radial air vents 950 unblocked, the air within the spindle 822, between the piston and the striker 838, is vented to atmosphere, preventing the air spring from developing and parking the striker 838 within the spindle 822 such that it cannot further reciprocate within the spindle 822.

Several embodiments are shown and described herein. It should be understood that other embodiments may have one or more of the features of the embodiments shown and described herein.

Various features and advantages are set forth in the following claims.

What is claimed is:

1. A percussion tool adapted to impart axial impacts to a tool bit, the percussion tool comprising:
- a housing;
- a motor supported by the housing;
- a spindle supported by the housing and including a plurality of radial air vents;
- a reciprocation mechanism operable to create a variable pressure air spring within the spindle;
- a striker received within the spindle for reciprocation in response to a pressure of the variable pressure air spring;
- an anvil received within the spindle and configured to be impacted by the striker, the anvil configured to transmit axial impacts from the striker to the tool bit;
- a chuck for securing the tool bit to the spindle; and
- a parking assembly movable relative to the spindle to selectively open and close the plurality of radial air vents, the parking assembly including a seat coupled to the spindle, a first shuttle portion movable relative to an outer surface of the spindle, the first shuttle portion including an inner surface and an annular recess in the inner surface, an elastomeric ring is positioned within the annular recess, the elastomeric ring configured to cover the plurality of radial air vents in a working position, a biasing member positioned between the seat and the first shuttle portion, a second shuttle portion movable relative to the outer surface of the spindle, a bushing positioned within the spindle and configured to receive a portion of the anvil, and a fastener that couples the second shuttle portion to the bushing, wherein the first shuttle portion and the second shuttle portion are movable together between the working position, in which the plurality of radial air vents is closed, and an idle position, in which the plurality of radial air vents is open, and wherein the biasing member is configured to bias the first shuttle portion and the second shuttle portion into the idle position.

2. The percussion tool of claim 1, wherein the first shuttle portion is formed from a first material, and wherein the second shuttle portion, the bushing, and the fastener are formed from a second material.

3. The percussion tool of claim 2, wherein the first material is metal and the second material is plastic.

4. The percussion tool of claim 1, wherein the seat includes a circumferential wall extending therefrom, the circumferential wall spaced apart from an outer surface of the spindle and surrounding the plurality of radial air vents.

5. The percussion tool of claim 1, wherein the elastomeric ring is positioned between the first shuttle portion and the second shuttle portion.

6. The percussion tool of claim 5, wherein the elastomeric ring contacts the first shuttle portion and the second shuttle portion.

7. The percussion tool of claim 5, wherein the first shuttle portion includes a flange and a circumferential wall extending axially from the flange, wherein the second shuttle portion includes a flange extending therefrom, and wherein the elastomeric ring is positioned between the outer surface of the spindle and the circumferential wall of the first shuttle portion, and also between the flange of the first shuttle portion and the flange of the second shuttle portion.

8. The percussion tool of claim 7, wherein the flange of the second shuttle portion is a first flange positioned at or adjacent a first end thereof, wherein the second shuttle portion further includes a second flange positioned at or adjacent a second end thereof, a third flange positioned between the first end and the second end, a first plurality of radial apertures positioned between the first flange and the third flange, and a second plurality of radial apertures positioned between the third flange and the second flange, wherein each of the first plurality of radial apertures and the second plurality of radial apertures are configured overlie one of a plurality of elongated air vents in the spindle, and wherein the fastener extends through one of the second plurality of radial apertures and one of the plurality of elongated air vents into an aperture of the bushing.

9. The percussion tool of claim 8, wherein the elastomeric ring is a first elastomeric ring, and wherein the parking assembly further comprises a second elastomeric ring positioned between the third flange and the second flange, and wherein the second elastomeric ring surrounds the second plurality of radial apertures and the fastener.

10. The percussion tool of claim 9, wherein the first shuttle portion includes an inner surface and an annular recess in the inner surface, and wherein a third elastomeric ring is positioned within the annular recess, the third elastomeric ring configured to cover the plurality of radial air vents in the working position.

11. A percussion tool adapted to impart axial impacts to a tool bit, the percussion tool comprising:

a housing;

a motor supported by the housing;

a spindle supported by the housing and including a plurality of radial air vents;

a reciprocation mechanism operable to create a variable pressure air spring within the spindle;

a striker received within the spindle for reciprocation in response to a pressure of the variable pressure air spring;

an anvil received within the spindle and configured to be impacted by the striker, the anvil configured to transmit axial impacts from the striker to the tool bit;

a chuck for securing the tool bit to the spindle; and a parking assembly movable relative to the spindle to selectively open and close the plurality of radial air vents, the parking assembly including a seat coupled to the spindle, a first shuttle portion movable relative to an outer surface of the spindle, a biasing member positioned between the seat and the first shuttle portion, a second shuttle portion movable relative to the outer surface of the spindle, an elastomeric ring positioned between and contacting the first shuttle portion and the second shuttle portion, and a fastener that couples the second shuttle portion to the anvil, wherein the first shuttle portion, the elastomeric ring, and the second shuttle portion are movable together between a working position, in which the plurality of radial air vents is closed, and an idle position, in which the plurality of radial air vents is open, and wherein the biasing member is configured to bias the first shuttle portion and the second shuttle portion into the idle position.

12. The percussion tool of claim 11, wherein the elastomeric ring is a first elastomeric ring, wherein the first shuttle portion includes an inner surface and an annular recess in the inner surface, and wherein a second elastomeric ring is positioned within the annular recess, the second elastomeric ring configured to cover the plurality of radial air vents in the working position.

13. The percussion tool of claim 12, further comprising a bushing positioned within the spindle and configured to receive a portion of the anvil, and wherein the fastener couples the second shuttle portion to the bushing.

14. The percussion tool of claim 13, wherein the second shuttle portion includes a first plurality of radial apertures positioned adjacent a first end thereof and a second plurality of radial apertures adjacent a second end thereof, wherein each of the first plurality of radial apertures and the second plurality of radial apertures are configured to overlie one of a plurality of elongated air vents in the spindle, and wherein the fastener extends through one of the second plurality of radial apertures and one of the plurality of elongated air vents into an aperture of the bushing.

15. The percussion tool of claim 14, wherein the parking assembly further comprises a third elastomeric ring surrounding the second plurality of radial apertures and the fastener.

16. The percussion tool of claim 14, wherein each of the first plurality of radial apertures is aligned with one of the second plurality of radial apertures in a length direction of the second shuttle portion.

17. The percussion tool of claim 14, wherein each of the first plurality of radial apertures is positioned between adjacent radial apertures of the second plurality of radial apertures.

18. The percussion tool of claim 12, wherein the second shuttle portion includes a first plurality of radial apertures positioned adjacent a first end thereof and a second plurality of radial apertures adjacent a second end thereof, wherein each of the first plurality of radial apertures and the second plurality of radial apertures are configured to overlie one of a plurality of elongated air vents in the spindle, and wherein the fastener extends through one of the second plurality of radial apertures and one of the plurality of elongated air vents into a bore of the anvil.

19. A percussion tool adapted to impart axial impacts to a tool bit, the percussion tool comprising:

a housing;

a motor supported by the housing;

a spindle supported by the housing and including a plurality of radial air vents;

a reciprocation mechanism operable to create a variable pressure air spring within the spindle;

a striker received within the spindle for reciprocation in response to a pressure of the variable pressure air spring;

an anvil received within the spindle and configured to be impacted by the striker, the anvil configured to transmit axial impacts from the striker to the tool bit;

a chuck for securing the tool bit to the spindle; and a parking assembly movable relative to the spindle to selectively open and close the plurality of radial air vents, the parking assembly including a seat coupled to the spindle, a shuttle movable relative to an outer surface of the spindle, the shuttle including a first end, a second end opposite the first end, an inner surface that extends between the first end and the second end, and an annular recess in the inner surface adjacent the first end, an elastomeric ring positioned within the annular recess, a biasing member positioned between the seat and the shuttle, and a fastener that couples the shuttle to the anvil, wherein shuttle is movable between a working position, in which the plurality of radial air vents is closed by the elastomeric ring, and an idle position, in which the plurality of radial air vents is open, and wherein the biasing member is configured to bias the shuttle into the idle position.

20. The percussion tool of claim 19, wherein the shuttle includes a first plurality of radial apertures positioned between the first end and the second end and a second plurality of radial apertures between the first plurality of radial apertures and the second end, wherein each of the first plurality of radial apertures and the second plurality of radial apertures are configured to overlie one of a plurality of elongated air vents in the spindle, and wherein the fastener extends through one of the second plurality of radial apertures and one of the plurality of elongated air vents into a bore of the anvil.

21. The percussion tool of claim 20, wherein the first plurality of radial apertures is positioned between a first flange and a second flange and the second plurality of radial apertures is positioned between the second flange and a third flange, wherein the biasing member extends between the seat and the first flange, wherein the parking assembly further comprises a second elastomeric ring positioned between the second flange and the third flange, and wherein the second elastomeric ring surrounds the second plurality of radial apertures and the fastener.

* * * * *